(12) United States Patent
Koelzer et al.

(10) Patent No.: US 11,338,786 B2
(45) Date of Patent: May 24, 2022

(54) SPRING BRAKE ACTUATOR WITH DIAPHRAGM RETAINER

(71) Applicant: HALDEX BRAKE PRODUCTS CORPORATION, Kansas City, MO (US)

(72) Inventors: Robert L. Koelzer, Olathe, KS (US); Albert D. Fisher, Kansas City, MO (US); Aaron C. Bradford, Olathe, KS (US); David C. Rhoads, Kansas City, MO (US); Michael R. Jenkins, Kansas City, MO (US)

(73) Assignee: HALDEX BRAKE PRODUCTS CORPORATION, Kansas City, MO (US)

(*) Notice: Subject to any disclaimer, the term of this patent is extended or adjusted under 35 U.S.C. 154(b) by 0 days.

(21) Appl. No.: 17/141,252

(22) Filed: Jan. 5, 2021

(65) Prior Publication Data

US 2021/0122352 A1 Apr. 29, 2021

Related U.S. Application Data

(63) Continuation of application No. 16/301,500, filed as application No. PCT/US2016/033475 on May 20, 2016, now Pat. No. 10,889,280.

(51) Int. Cl.
*B60T 17/08* (2006.01)
*B60T 15/54* (2006.01)
*B60T 13/38* (2006.01)
*F16D 65/28* (2006.01)
*F16D 121/10* (2012.01)
*F16D 125/12* (2012.01)

(52) U.S. Cl.
CPC ............... *B60T 15/54* (2013.01); *B60T 13/38* (2013.01); *B60T 17/08* (2013.01); *B60T 17/085* (2013.01); *B60T 17/088* (2013.01); *F16D 65/28* (2013.01); *F16D 2121/10* (2013.01); *F16D 2125/12* (2013.01)

(58) Field of Classification Search
CPC .......... B60T 15/54; B60T 13/38; B60T 17/08; B60T 17/083; B60T 17/085; B60T 17/088; F16D 65/28; F16D 2121/10; F16D 2125/12
See application file for complete search history.

(56) References Cited

U.S. PATENT DOCUMENTS

| | | | |
|---|---|---|---|
| 7,121,191 B1 * | 10/2006 | Fisher ............... | B60T 17/083 92/63 |
| 8,978,839 B2 * | 3/2015 | Bradford ............... | B60T 17/083 188/106 F |
| 9,688,261 B2 * | 6/2017 | Bradford ............... | B60T 17/086 |
| 9,701,297 B2 * | 7/2017 | Fisher ............... | B60T 17/083 |
| 10,391,997 B2 * | 8/2019 | Bradford ............... | B60T 17/086 |

(Continued)

*Primary Examiner* — Thomas W Irvin
(74) *Attorney, Agent, or Firm* — Stinson LLP

(57) ABSTRACT

A brake actuator assembly including a pressure plate presenting an opening, a push rod that is coupled to the pressure plate, a diaphragm that is coupled to the pressure plate, and a retainer that engages the push rod. The push rod has an outer surface and at least one protrusion extending outward from the outer surface. The retainer engages the protrusion such that at least a portion of the diaphragm is positioned between the pressure plate and the retainer.

23 Claims, 5 Drawing Sheets

(56) References Cited

U.S. PATENT DOCUMENTS

| | | | |
|---|---|---|---|
| 10,493,972 B2* | 12/2019 | Fisher | F16D 65/28 |
| 10,889,280 B2* | 1/2021 | Koelzer | B60T 17/088 |
| 2013/0239799 A1* | 9/2013 | Bradford | B60T 17/083 92/63 |
| 2013/0292216 A1* | 11/2013 | Bradford | F16D 65/28 188/106 F |

* cited by examiner

SPRING BRAKE ACTUATOR WITH DIAPHRAGM RETAINER

CROSS-REFERENCE TO RELATED APPLICATIONS

This application claims priority to and is a Continuation of U.S. patent application Ser. No. 16/301,500, filed on Nov. 14, 2018 (issued as U.S. Pat. No. 10,889,280 on Jan. 12, 2021), which is a national stage application from International Patent Application PCT/US2016/033475, filed on May 20, 2016, each of which is incorporated herein by reference in its entirety.

BACKGROUND OF THE INVENTION

1. Field of the Invention

The present invention is directed generally to a pneumatic spring brake actuator and, more specifically, to a spring brake actuator assembly having a diaphragm retainer.

2. Description of Related Art

A pneumatic brake system for a large, heavy-duty vehicle, such as a bus, truck, semi-tractor, trailer, recreational vehicle, or construction equipment, typically includes a brake shoe and drum assembly that is actuated by an actuator operated by the selective application of compressed air. A conventional pneumatic spring brake actuator has both a service brake actuator, which actuates the brakes under normal driving conditions by the application of compressed air, and an emergency or spring brake actuator, which actuates the brakes when air pressure has been released from a pressure chamber.

One common type of spring brake actuator includes a diaphragm that divides the actuator into a pressure chamber and a spring chamber. The spring chamber contains a large force compression spring that is compressed when the pressure chamber is pressurized and the emergency or parking brakes are not applied. When the pressure chamber is depressurized, the spring expands to apply the emergency or parking brakes. A pressure plate is positioned between the diaphragm and the spring within the spring chamber. A push rod is coupled to the pressure plate and extends through a dividing wall separating the spring brake actuator from the service brake actuator. In one configuration, the diaphragm sealingly engages the push rod and/or pressure plate to seal the pressure chamber from the spring chamber so that the emergency or parking brakes may be disengaged. The diaphragm must remain in sealing engagement with the push rod and/or pressure plate to allow the emergency or parking brakes to be disengaged by pressurization of the pressure chamber.

When the emergency or parking brakes are disengaged, the pressure chamber increases in volume and the spring chamber decreases in volume, which results in a pressure increase in the spring chamber. The spring chamber is typically vented to prevent it from becoming pressurized. One way of venting the spring chamber while preventing water and contaminants from entering the spring chamber is to include a fluid flow path between the spring chamber of the spring brake actuator and the service brake pressure chamber through the push rod. In such an actuator, a valve assembly is placed in the push rod to regulate air flow between the spring chamber and the service brake pressure chamber.

BRIEF SUMMARY OF THE INVENTION

One embodiment of the invention disclosed herein is directed to a brake actuator assembly including a pressure plate presenting an opening, a push rod that is coupled to the pressure plate, a diaphragm that is coupled to the pressure plate, and a retainer that engages the push rod. The push rod has an outer surface and at least one protrusion extending outward from the outer surface. The retainer engages the protrusion such that at least a portion of the diaphragm is positioned between the pressure plate and the retainer. The retainer preferably ensures that the diaphragm remains coupled to the pressure plate in the event that pressurized air exerts a force on a side of the diaphragm that is opposite the retainer. A portion of the diaphragm may be clamped between the retainer and the pressure plate. The push rod preferably frictionally engages the pressure plate.

The brake actuator assembly also preferably includes a bearing that is coupled to the push rod. The bearing preferably includes threads that engage threads on an interior surface of the push rod. Preferably, the brake actuator assembly is used in a spring brake actuator. The spring brake actuator may be part of a double diaphragm brake actuator also including a service brake actuator. A valve assembly with a one-way seal valve is preferably coupled to an end of the push rod to allow air to discharge from a spring chamber as the spring brake actuator moves from an engaged to a disengaged position.

Additional aspects of the invention, together with the advantages and novel features appurtenant thereto, will be set forth in part in the description which follows, and in part will become apparent to those skilled in the art upon examination of the following, or may be learned from the practice of the invention. The objects and advantages of the invention may be realized and attained by means of the instrumentalities and combinations particularly pointed out in the appended claims.

DETAILED DESCRIPTION OF PREFERRED EMBODIMENT

Figure 1:
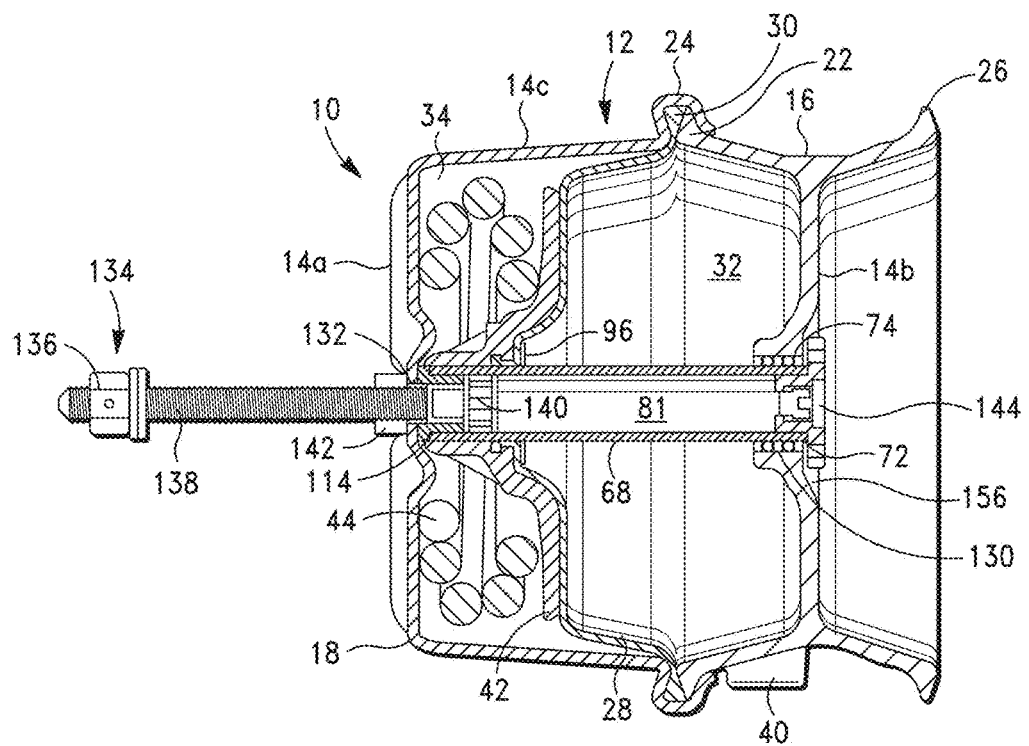
FIG. 1 is a cross-sectional view of a spring brake actuator in accordance with the invention described herein.

A spring brake actuator in accordance with at least one embodiment of the invention described herein is identified generally as 10 in FIG. 1. Spring brake actuator 10 may be part of a tandem-type pneumatic brake actuator also including a service brake actuator (not shown); however, it is also within the scope of the invention for the spring brake actuator 10 to be used on its own. As is known in the art, spring brake actuator 10 is designed to apply the emergency or parking brakes of a vehicle on which it is installed.

The spring brake actuator 10 includes a sealed spring brake housing 12 having first and second end walls 14a and 14b and a side wall 14c that is joined with and extends between the end walls 14a and 14b. The spring brake housing 12 is formed by an adapter housing 16 that is coupled with a spring brake cover 18. The adapter housing 16 has a flange 22 that is clamped by a C-shaped rolled rim 24 of spring brake cover 18 to secure the spring brake cover 18 to the adapter housing 16. The adapter housing 16 has a flange 26 that is operable to receive a clamp (not shown) to clamp a service brake cover (not shown) to the adapter housing 16.

An elastomeric diaphragm 28 spans the interior of the spring brake housing 12. Diaphragm 28 has a peripheral edge 30 that is sealingly clamped between the flange 22 of adapter housing 16 and the rolled rim 24 of spring brake cover 18. Another diaphragm (not shown) may be clamped between flange 26 and a flange (not shown) of a service brake cover (not shown) to divide a service brake housing (not shown).

Figure 2:
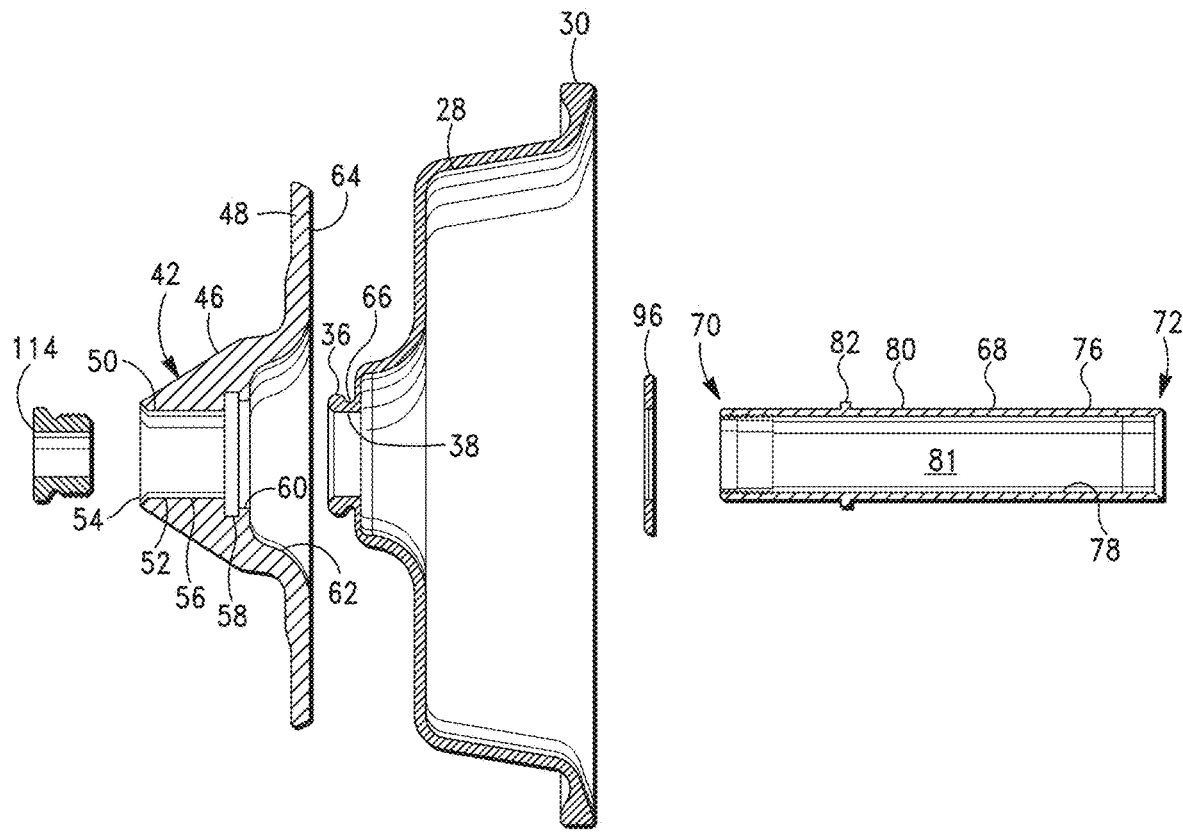
FIG. 2 is an exploded, cross-sectional view of a bearing, a pressure plate, a diaphragm, a retainer, and a push rod of the spring brake actuator of FIG. 1.

Diaphragm 28 fluidly divides the spring brake housing 12 into a pressure chamber 32 and a spring chamber 34. As shown in FIG. 2, diaphragm 28 extends from its peripheral edge 30 to an inner edge 36 that surrounds an opening 38 in the diaphragm 28. The pressure chamber 32 is fluidly connected to a source of pressurized air through a port 40 shown in FIG. 1. The spring chamber 34 is sealed to protect the components therein from direct exposure to the atmosphere and common environmental contaminants.

A pressure plate 42 is positioned in the spring chamber 34 adjacent to the diaphragm 28. A large force compression spring 44 is placed between the pressure plate 42 and the spring brake cover 18. As shown in FIG. 2, pressure plate 42 includes a central section 46 that is generally shaped like a truncated cone and a flange 48 extending radially outward from the central section 46. An axial opening 50 extends through central section 46. An interior surface 52 of pressure plate 42 surrounds opening 50. At one end of pressure plate 42, the interior surface 52 includes a countersink or angled section 54. A cylindrical section 56 extends from the angled section 54 to an annular groove 58. A cylindrical section 60 having a slightly larger diameter than cylindrical section 56 extends from groove 58 to a bell shaped section 62. Bell shaped section 62 extends to a generally planar surface 64 of flange 48.

Figure 3:
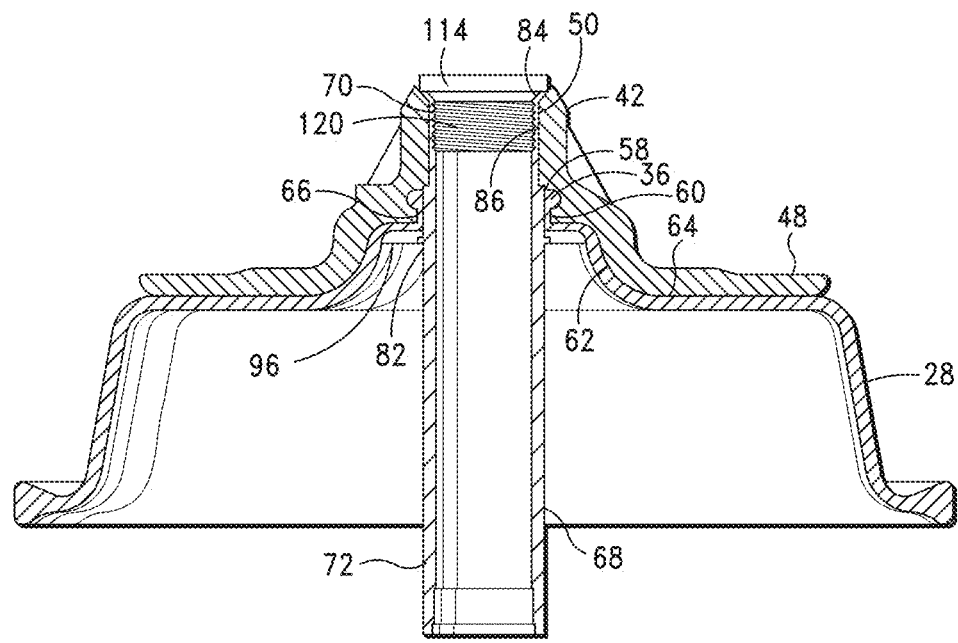
FIG. 3 is an assembled, cross-sectional view of the components shown in FIG. 2.

Referring to FIG. 3, groove 58 receives inner edge 36 of diaphragm 28. Inner edge 36 extends radially outward from an adjacent cylindrical section 66 of diaphragm 28. Inner edge 36 is shaped to generally fill groove 58 to join diaphragm 28 to pressure plate 42 and seal between diaphragm 28 and pressure plate 42. The cylindrical section 60, bell shaped section 62 and planar surface 64 of flange 48 generally match the contour of diaphragm 28 so that the pressure plate 42 and diaphragm 28 closely abut each other as shown in FIG. 3.

As shown in FIG. 3, a hollow push rod 68 has a first end 70 that is press fit within the opening 50 of pressure plate 42 and a second end 72 that extends through an opening 74 (FIG. 1) in adapter housing 16. The push rod 68 has a side wall 76 with inner and outer surfaces 78 and 80, respectively, identified in FIG. 2. Inner surface 78 surrounds a passageway 81 through the push rod 68. An annular protrusion 82 extends radially outward from outer surface 80 near first end 70. Protrusion 82 extends continuously around the cylindrical outer surface 80; however, it is within the scope of the invention for the protrusion 82 to not extend continuously around the outer surface 80 and/or for there to be multiple protrusions like 82 extending outward from the outer surface 80.

Figure 5:
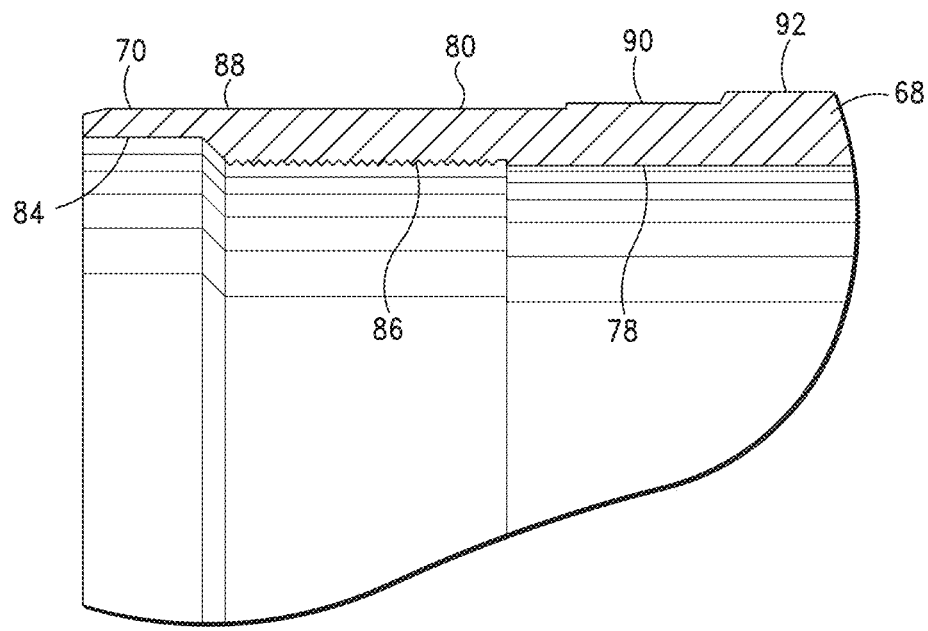
FIG. 5 is a detail view of one end of the push rod.
Figure 6:
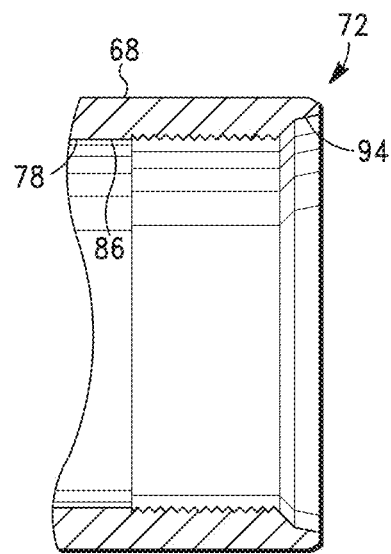
FIG. 6 is a detail view of the other end of the push rod.
Figure 7:
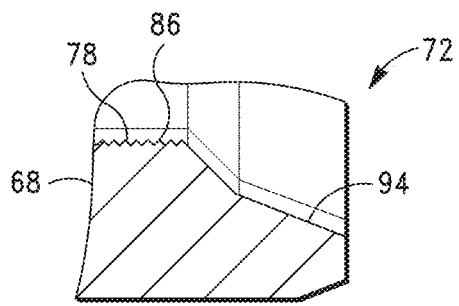
FIG. 7 is a close-up view of the end of the push rod shown in FIG. 6.

Referring to FIG. 5, at the first end 70 of push rod 68, inner surface 78 has a first section 84 having a greater internal diameter than a second section 86 to form a reduced wall thickness portion of push rod 68. Threads are formed in a portion of second section 86 adjacent first section 84. Outer surface 80 of push rod 68 has a first section 88 extending from first end 70 just beyond the second section 86 of inner surface 78, a second section 90 extending from the first section 88 and a third section 92 extending from the second section 90 to the second end 72. The first section 88 has a slightly smaller outer diameter than the second section 90, and the second section 90 has a slightly smaller outer diameter than the third section 92. Referring to FIGS. 6 and 7, inner surface 78 has a third section 94 extending from second section 86 to second end 72. Third section 94 angles radially outward from second section 86 to second end 72 to form a reduced wall thickness portion of push rod 68. Threads are formed in a portion of second section 86 adjacent third section 94.

Push rod 68 is pressed into pressure plate 42 so that the outer surface 80 of push rod 68 frictionally engages the interior surface 52 (FIG. 2) of pressure plate 42 to join the push rod 68 and pressure plate 42. Push rod 68 is also pressed through the opening 38 (FIG. 2) in diaphragm 28 to compress the inner edge 36 and cylindrical section 66 of diaphragm 28 between push rod 68 and pressure plate 42 as shown in FIG. 3. A seal is preferably formed between diaphragm 28 and push rod 68 and between diaphragm 28 and pressure plate 42.

Figure 4:
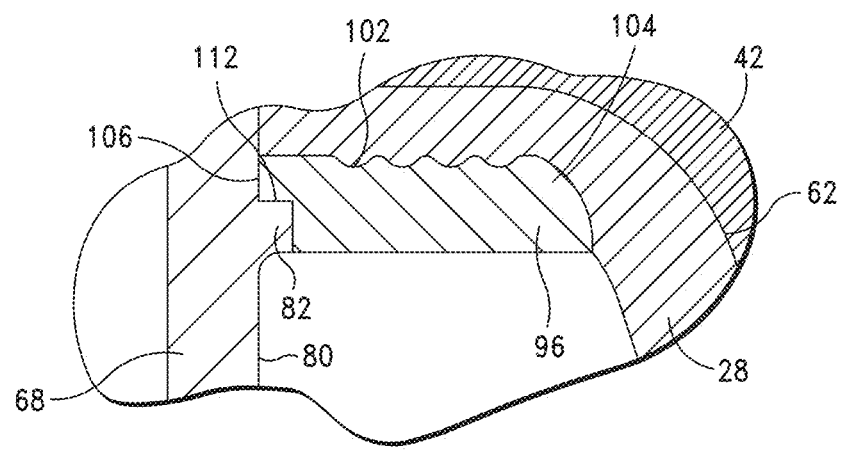
FIG. 4 is a detail view of a protrusion of the push rod that engages the retainer.
Figure 8:
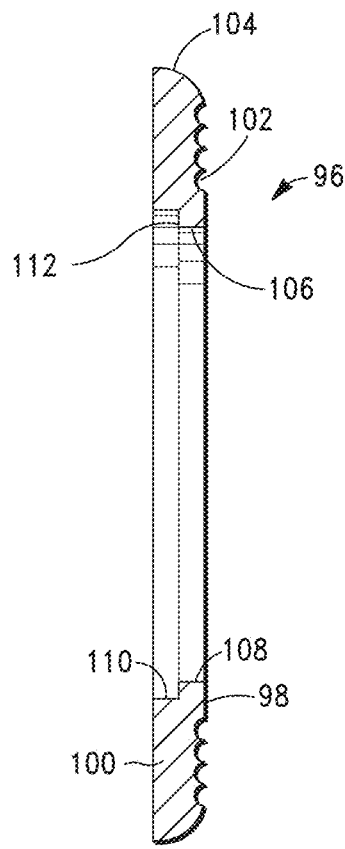
FIG. 8 is a cross-sectional view of the retainer.

A retainer 96 engages the protrusion 82 of push rod 68 to assist in securing diaphragm 28 to pressure plate 42 and push rod 68. Referring to FIG. 8, retainer 96 has a first side 98 and a second side 100. First side 98 includes four concentric annular depressions, one of which is identified as 102, that assist in frictionally engaging diaphragm 28, as shown in FIG. 4, to prevent slippage between the retainer 96 and diaphragm 28. A peripheral edge 104 of first side 98 is curved to match the curvature of diaphragm 28 and bell shaped section 62 of pressure plate 42, as shown in FIGS. 3 and 4. Retainer 96 presents a central opening 106 that receives a portion of push rod 68. Referring to FIG. 8, opening 106 includes a first section 108 adjacent first side 98 and a second section 110 adjacent second side 100. First section 108 has a smaller internal diameter than second section 110 to form an annular surface 112 between the first section 108 and second section 110. As shown in FIG. 4, protrusion 82 of push rod 68 engages the annular surface 112 of retainer 96 to clamp retainer 96 between protrusion 82 and diaphragm 28 and to clamp diaphragm 28 between retainer 96 and pressure plate 42. A portion of the diaphragm 28 is preferably compressed between the retainer 96 and pressure plate 42, which may form a seal between the diaphragm 28 and pressure plate 42 and between the diaphragm 28 and retainer 96. In particular, retainer 96 prevents the diaphragm 28 from being forced away and decoupled from pressure plate 42 if pressurized air enters the space between push rod 68 and pressure plate 42 and exerts a force on diaphragm 28 in a direction pushing the diaphragm 28 away from the pressure plate 42. Retainer 96 is generally annular and extends laterally outward from the outer surface 80 of push rod 68.

Figure 9:
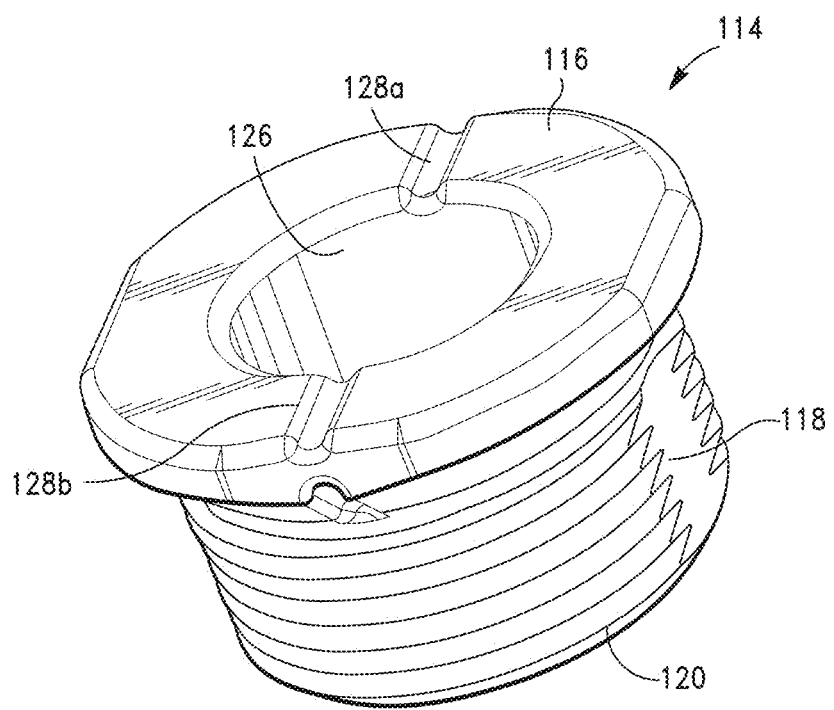
FIG. 9 is a perspective view of the bearing.
Figure 10:
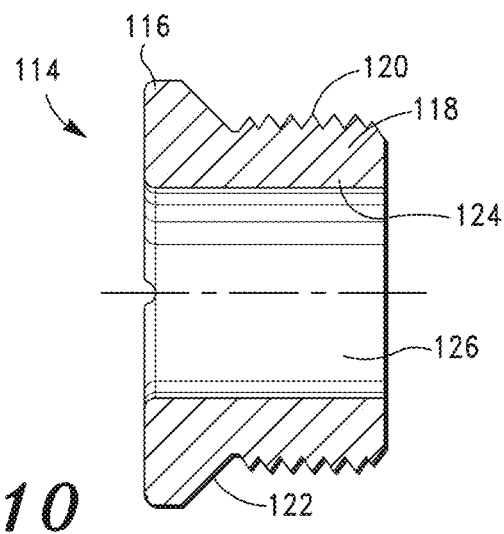
FIG. 10 is a cross-sectional view of the bearing.

Referring to FIG. 9, a bearing 114 has a head 116 and a cylinder 118 with a smaller outer diameter than head 116. Cylinder 118 has a threaded outer surface 120 that is positioned within push rod 68 and engages the threaded second section 86 of push rod 68, as shown in FIG. 3, thereby joining the bearing 114 to the push rod 68. The bearing 114 is also indirectly joined to the pressure plate 42, diaphragm 28 and retainer 96. Referring to FIG. 10, bearing 114 includes a truncated conical surface 122 extending from head 116 to cylinder 118. The truncated conical surface 122 mates with the angled section 54 of pressure plate 42 shown in FIG. 2. As shown in FIG. 3, the first section 84 of push rod 68 is swaged between the truncated conical surface 122 (FIG. 10) of bearing 114 and the angled section 54 (FIG. 2) of pressure plate 42 to form a seal between the bearing 114, push rod 68, and pressure plate 42. Threading bearing 114 into push rod 68 may pull push rod 68 toward bearing 114 and generate a clamping force that clamps diaphragm 28 between retainer 96 and pressure plate 42. It is within the scope of the invention for the bearing 114 to be bonded to the push rod 68 in addition to or instead of being joined with threads. For example, the bearing 114 can be welded to the push rod 68.

As shown in FIG. 10, bearing 114 has a smooth inner surface 124 surrounding an opening 126. Grooves 128a-b, shown in FIG. 9, are formed in head 116. Grooves 128a-b preferably assist in allowing air to move from spring chamber 34 through opening 126 into the passageway 81 formed within push rod 68, particularly when bearing 114 is positioned adjacent spring brake cover 18 as shown in FIG. 1. Spring chamber 34 is in fluid communication with the passageway 81 within push rod 68 through the opening 126 in bearing 114.

The push rod 68 extends from its first end 70, which is positioned near spring chamber 34, through a bearing and seal assembly 130 (FIG. 1) positioned within opening 74 formed in the adapter housing 16 to its second end 72, which may be positioned in a service brake pressure chamber (not shown). The bearing and seal assembly 130 is well known in the art and thus is not described in more detail herein.

An opening 132 (FIG. 1) in spring brake cover 18 is aligned with opening 126 (FIG. 9) in bearing 114 and opening 50 (FIG. 2) in pressure plate 42. Referring to FIG. 1, a caging bolt assembly 134 includes an adjustment nut 136 threaded onto and permanently affixed to one end of a caging bolt 138, which terminates at its other end in a caging bolt head 140. The caging bolt head 140 and a portion of the caging bolt 138 extending from the head 140 are positioned within the passageway 81 of the push rod 68. The caging bolt 138 extends through the opening 126 (FIG. 9) of the bearing 114 and through the opening 132 in the spring brake cover 18. The caging bolt 138 is threaded through a cap or collar 142, which is riveted and permanently affixed to the spring brake cover 18 in a substantially sealed manner so that air cannot pass through opening 132.

The caging bolt head 140 preferably includes a bearing (not shown) positioned between opposing collars (not shown). The bearing (not shown) contacts the inner surface 78 (FIG. 2) of the push rod 68 to prevent the collars (not shown) and caging bolt 138 from contacting the inner surface 78 while helping to guide the reciprocal movement of the push rod 68 during the application and release of the emergency brakes. Axial slots (not shown) are formed in the face of the bearing (not shown) to form a fluid flow path around the bearing (not shown) so that the spring chamber 34 is in fluid communication with the entire passageway 81 within the push rod 68.

The caging bolt assembly 134 is operable to mechanically retract and hold the large force compression spring 44 in a compressed state (as shown in FIG. 1). By engaging the adjustment nut 136 with a wrench or socket and rotating the nut 136 and caging bolt 138, the caging bolt 138 moves to the left when viewed as shown in FIG. 1 until the majority of the caging bolt 138 is withdrawn from the spring brake housing 18. As the caging bolt 138 is withdrawn, the caging bolt head 140 contacts the bearing 114 to move the bearing 114, push rod 68, and pressure plate 42 toward the end wall 14a of the spring brake housing 18 thereby compressing the spring 44. Because the caging bolt head 140 has a diameter that is greater than the diameter of the opening 126 in bearing 114, the caging bolt 138 is operable to couple the pressure plate 42 to the spring brake cover 18 via the connection between the bearing 114 and pressure plate 42 and the connections between the caging bolt 138, collar 142, and spring brake cover 18. Caging the large force compression spring 44 in this manner, as shown in FIG. 1, is well known and is typically utilized during assembly of the spring brake actuator 10 and/or for the mechanical release of the emergency or parking brakes in the case of a failure or absence of the compressed air system connected to port 40. When the vehicle on which spring brake actuator 10 is installed is in active use, the caging bolt 138 is moved to the right when viewed as shown in FIG. 1 so that the spring 44, pressure plate 42, and push rod 68 may move freely with respect to the caging bolt 138. When the emergency or parking brakes are applied and retracted by expansion and contraction of spring 44, surface 124 (FIG. 10) of bearing 114 slides on the caging bolt 138 to guide and center the push rod 68, pressure plate 42, and diaphragm 28.

Figure 11:
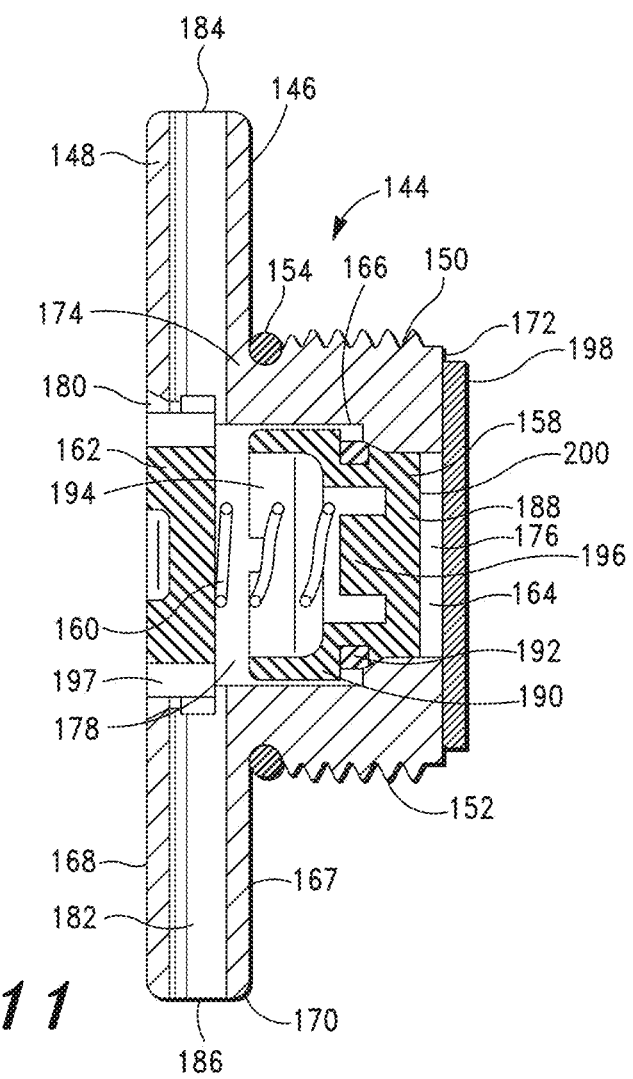
FIG. 11 is a cross-sectional view of a valve assembly of the spring brake actuator of FIG. 1.

As shown in FIG. 1, a valve assembly 144 is joined to and closes the second end 72 of the push rod 68 for regulating fluid flow between spring chamber 34 and a service brake pressure chamber (not shown). Referring to FIG. 11, valve assembly 144 includes a valve body 146 having a generally circular transfer plate 148 that is joined to a cylindrical protrusion 150. The cylindrical protrusion 150 has a threaded side wall 152 that engages the threaded inner surface 78 of push rod 68 shown in FIG. 6. The protrusion 150 is at least partially positioned within the passageway 81 of the push rod 68. An o-ring seal 154 is positioned at the base of protrusion 150 between the threaded side wall 152 of the valve assembly 150 and push rod 68 to prevent fluid from flowing between the side wall 152 of valve assembly 150 and push rod 68. The third section 94 of the inner surface 78 of push rod 68, shown in FIG. 7, is configured to engage and squeeze seal 154 to prevent fluid from flowing between side wall 152 of valve assembly 150 and push rod 68 without damaging seal 154. Preferably, a liquid sealant is applied to the threaded side wall 152 before the valve assembly 144 is threaded within the push rod 68. The liquid sealant hardens to form a seal between the valve assembly 144 and push rod 68 and also prevents the valve assembly 144 from becoming loose from the push rod 68. The transfer plate 148 is preferably sized to be received within a recess 156 (FIG. 1) in the adapter housing 16.

A seal 158, spring 160, and retainer 162 are positioned inside a channel 164 defined by an interior surface 166 of the valve body 146. The transfer plate 148 of the valve body 146 has first and second surfaces 167 and 168 that are joined by a side wall 170. The cylindrical protrusion 150 of the valve body 146 has first and second surfaces 172 and 174 that are joined by threaded side wall 152. The second surface 174 of the protrusion 150 is joined to and is integral with the first surface 167 of transfer plate 148. The channel 164 through valve body 146 includes a first cylindrical section 176 extending from the first surface 172 of cylindrical protrusion 150, a second cylindrical section 178 extending from first cylindrical section 176 to transfer plate 148, and a third cylindrical section 180 extending from second cylindrical section 178 to second surface 168 of transfer plate 148. Second cylindrical section 178 has a diameter that is greater than first cylindrical section 176, and third cylindrical section 180 has a diameter that is greater than second cylindrical section 178. The channel 164 also includes a fourth section 182 extending through transfer plate 148 between openings 184 and 186 in side wall 170.

Seal 158 has a first section 188 with an outer diameter that is slightly less than the diameter of first cylindrical section 176. Seal 158 has a second section 190 that is integral with first section 188 and that has an outer diameter that is slightly less than the diameter of second cylindrical section 178. A square ring seal 192 is positioned within a groove around the base of the first section 188. An end of spring 160 is positioned within an internal cavity 194 of seal 158 around a spring retaining cylinder 196. The other end of spring 160 abuts retainer 162. Spring 160 biases seal 158 to a closed position, in which square ring seal 192 engages interior surface 166 of valve body 146 to prevent fluid from flowing through channel 164. Retainer 162 has a diameter that is substantially equal to the diameter of third cylindrical section 180. Retainer 162 is pressed into third cylindrical section 180 to retain seal 158 and spring 160 within channel 164. Retainer 162 has openings, one of which is identified as 197, to allow air to flow through it. A filter 198 is adhered to the first surface 172 of cylindrical protrusion 150.

Seal 158 is moveable between the closed position shown in FIG. 11, in which fluid is blocked from flowing between the spring chamber 34 (FIG. 1) and service brake pressure chamber (not shown) on the opposite side of wall 14*b* to an open position (not shown), in which fluid can flow between the spring chamber 34 and the service brake pressure chamber (not shown) through the channel 164 of the valve body 146. In the open position (not shown), seal 158 is moved to the left, when viewed as shown in FIG. 11, and spring 160 is compressed. Seal 158 moves from its closed position to its open position when the pressure in spring chamber 34 increases to a threshold level at which the force exerted on a surface 200 of seal 158 due to the pressure in spring chamber 34 and passageway 81 is greater than the sum of the forces exerted on the seal 158 due to the pressure in service brake pressure chamber (not shown) and the biasing force of spring 160. When the seal 158 is in its closed position, service brake pressure chamber (not shown) can be pressurized to activate a service brake actuator (not shown) without undesirably pressurizing the spring chamber 34.

Valve assembly 144 is a one-way valve that allows air to vent from the spring chamber 34 as pressure chamber 32 is being pressurized and spring chamber 34 is being compressed to deactivate a vehicle's emergency or parking brakes. Valve assembly 144 does not allow air into spring chamber 34 to prevent formation of a vacuum in the spring chamber 34 when the emergency or parking brakes are applied. Instead, spring 44 is sized to overcome any vacuum formed in spring chamber 34 to timely apply a vehicle's emergency or parking brakes.

In operation, the spring brake actuator 10 is moveable between the disengaged position shown in FIG. 1 and an engaged position (not shown) as described herein. When the vehicle on which spring brake actuator 10 is installed is parked for an extended period of time, the spring brake actuator 10 is typically in the engaged position. In the engaged position, pressure is released from the pressure chamber 32 so that the compression spring 44 pushes the pressure plate 42 and the diaphragm 28 toward the adapter housing 16. As a result, the push rod 68 connected to the pressure plate 42 is pushed through the opening 74 in the adapter housing 16. The transfer plate 148 (FIG. 11) of the valve assembly 144 exerts a force on a diaphragm (not shown) and pressure plate (not shown) of a service brake actuator (not shown), which actuates the vehicle's parking or emergency brakes. When the spring brake actuator 10 is in the engaged position, the vehicle on which the spring brake actuator 10 is installed cannot move. To allow the vehicle to move, the spring 44 must be retracted either by pressurizing the pressure chamber 32 or by mechanically retracting the spring 44 with caging bolt 138, as shown in FIG. 1 and described above. Mechanical retraction of spring 44 with caging bolt 138 is typically only necessary during assembly of the spring brake actuator 10 and/or when mechanical release of the spring brake actuator 10 is necessary due to a failure or absence of the compressed air system connected to port 40.

When pressure chamber 32 is pressurized, diaphragm 28 and pressure plate 42 retract spring 44 and compress it against housing wall 14*a* to move the spring brake actuator 10 to its disengaged position. The movement of pressure plate 42 causes push rod 68 to retract through opening 74 in adapter housing 16, which releases the vehicle's parking brakes. Bearing 114 allows the pressure plate 42 and push rod 68 to move with respect to the caging bolt 138 between the engaged and disengaged positions while preventing damage to the pressure plate 42, push rod 68, and caging bolt 138. The inner surface 124 (FIG. 10) of the bearing 114 is in close contact with caging bolt 138 to guide movement of the pressure plate 42 and push rod 68. The inner surface 124 of the bearing 114 is preferably relatively smooth to minimize damage to the threads of the caging bolt 138.

As pressure chamber 32 is pressurized to release the vehicle's parking brakes, the volume of the pressure chamber 32 increases due to the retraction of spring 44. As the volume of pressure chamber 32 increases, the volume of spring chamber 34 decreases thereby increasing the pressure of the air contained therein. The pressurized air in the spring chamber 34 is fluidly connected to the valve assembly 144 through the bearing 114 and the passageway 81 through the push rod 68. The pressurized air entering valve assembly 144 exerts a force on seal 158 (FIG. 11) that moves seal 158 to its open position when the biasing force of spring 160 is overcome. The pressurized air flows through valve assembly 144 into a service brake pressure chamber (not shown) to prevent pressure build up in spring chamber 34. Spring 160 moves seal 158 back to its closed position when the sum of the biasing force of spring 160 and force exerted on seal 158 due to pressure in the service brake pressure chamber (not shown) is greater than the force exerted on seal 158 by the pressurized air in spring chamber 34.

When the spring brake actuator 10 is applied by exhausting the pressurized air from pressure chamber 32, the volume of spring chamber 34 expands causing the pressure within the chamber 34 to drop. As valve assembly 144 is a one-way valve that is biased to a closed position, air does not flow through the valve assembly 144 from the service brake pressure chamber (not shown) into the spring chamber 34 to alleviate the vacuum. However, spring 44 is sized to overcome any vacuum formation in spring chamber 34 so that the emergency brakes are timely applied.

When the spring brake actuator 10 is in the disengaged position shown in FIG. 1 and the vehicle on which the brake actuator 10 is installed is in transit, a service brake actuator (not shown) is utilized to brake the vehicle. Valve assembly 144 is biased to a closed position to prevent air from the service brake actuator (not shown) from entering spring chamber 34 through valve assembly 144.

From the foregoing it will be seen that this invention is one well adapted to attain all ends and objectives hereinabove set forth, together with the other advantages which are obvious and which are inherent to the invention.

Since many possible embodiments may be made of the invention without departing from the scope thereof, it is to be understood that all matters herein set forth or shown in the accompanying drawings are to be interpreted as illustrative, and not in a limiting sense.

While specific embodiments have been shown and discussed, various modifications may of course be made, and the invention is not limited to the specific forms or arrangement of parts and steps described herein, except insofar as such limitations are included in the following claims. Further, it will be understood that certain features and subcombinations are of utility and may be employed without reference to other features and subcombinations. This is contemplated by and is within the scope of the claims.

What is claimed and desired to be secured by Letters Patent is as follows:

1. A brake actuator assembly comprising:
  a pressure plate presenting an opening;
  a push rod that is coupled to the pressure plate, wherein the push rod comprises an outer surface and at least one protrusion extending outward from the outer surface;
  a bearing comprising a head and a cylinder with a smaller outer diameter than the head, wherein the cylinder is coupled to the push rod and received within the push rod, and wherein an end of the push rod is positioned between the bearing and the pressure plate;
  a diaphragm that is coupled to the pressure plate; and
  a retainer that engages the protrusion, wherein at least a portion of the diaphragm is positioned between the pressure plate and the retainer.

2. The brake actuator assembly of claim 1, wherein the push rod is at least partially received by the opening.

3. The brake actuator assembly of claim 2, wherein the push rod frictionally engages an interior surface of the pressure plate surrounding the opening.

4. The brake actuator assembly of claim 1, wherein a portion of the diaphragm is positioned between the pressure plate and the push rod.

5. The brake actuator assembly of claim 1, wherein the protrusion is annular.

6. The brake actuator assembly of claim 1, wherein the retainer is annular and extends laterally outward from the push rod.

7. The brake actuator assembly of claim 1, wherein a portion of the diaphragm is compressed between the retainer and the pressure plate.

8. The brake actuator assembly of claim 1, wherein an interior surface of the pressure plate surrounds the opening, and wherein a groove formed in the interior surface receives an end of the diaphragm.

9. The brake actuator assembly of claim 1, wherein at least a portion of the retainer is positioned between the protrusion and the diaphragm.

10. The brake actuator assembly of claim 1, wherein the bearing comprises threads that engage threads formed in the push rod.

11. The brake actuator assembly of claim 1, wherein an end of the push rod is swaged between the bearing and the pressure plate.

12. The brake actuator assembly of claim 1, wherein the push rod comprises an interior surface surrounding a passageway, and further comprising a valve assembly that is coupled to the push rod.

13. The brake actuator assembly of claim 12, further comprising a housing that is divided by the diaphragm into a spring chamber and a pressure chamber, wherein the valve assembly comprises a seal that is biased to a closed position with a biasing force, and wherein the seal is operable to move to an open position when a force exerted on the seal due to a pressure in the spring chamber exceeds the biasing force.

14. The brake actuator assembly of claim 13, wherein the valve assembly is operable to exhaust air from the spring chamber and the passageway when the seal is in the open position, and wherein the valve assembly blocks air from entering the spring chamber through the passageway when the seal is in the closed position.

15. A brake actuator assembly comprising:
  a pressure plate presenting an opening that extends through the pressure plate from a first end of the pressure plate to a second end of the pressure plate;
  a push rod that is coupled to the pressure plate, wherein the push rod extends through the opening in the pressure plate from the first end of the pressure plate to the second end of the pressure plate, wherein the push rod comprises an outer surface and at least one protrusion extending outward from the outer surface;
  a diaphragm that is coupled to the pressure plate; and
  a retainer that engages the protrusion, wherein at least a portion of the diaphragm is positioned between the pressure plate and the retainer.

16. The brake actuator assembly of claim 15, further comprising a bearing comprising a head and a cylinder with a smaller outer diameter than the head, wherein the cylinder is coupled to the push rod and received within the push rod, and wherein an end of the push rod is positioned between the bearing and the pressure plate.

17. The brake actuator assembly of claim 15, wherein the push rod comprises a first end and a second end, and the push rod is coupled to the pressure plate at the first end of the push rod, wherein the retainer presents a retainer opening that receives a portion of the push rod, wherein the outer surface of the push rod at the first end has an outer diameter that is less than an inner diameter of the retainer opening.

18. The brake actuator assembly of claim 15, further comprising a bearing that is coupled to the push rod, wherein at least a portion of the bearing is received within the push rod, and wherein an end of the push rod is swaged between the bearing and the pressure plate.

19. A brake actuator assembly comprising:
  a housing;
  a pressure plate presenting an opening;
  a push rod that is coupled to the pressure plate, wherein the push rod comprises an outer surface and at least one protrusion extending outward from the outer surface, wherein the push rod comprises an interior surface surrounding a passageway;
  a diaphragm that is coupled to the pressure plate, the diaphragm and pressure plate dividing the housing into a spring chamber and a pressure chamber;
  a retainer that engages the protrusion, wherein at least a portion of the diaphragm is positioned between the pressure plate and the retainer; and a valve assembly that is coupled to the push rod, the valve assembly comprising a seal that is biased to a closed position with a biasing force, wherein the seal is operable to move to an open position when a force exerted on the seal due to a pressure in the spring chamber exceeds the biasing force, wherein the valve assembly is operable to exhaust air from the spring chamber and the passageway when the seal is in the open position, and wherein the valve assembly blocks air from entering the spring chamber through the passageway when the seal is in the closed position.

20. The brake actuator assembly of claim 19, further comprising a bearing comprising a head and a cylinder with a smaller outer diameter than the head, wherein the cylinder is coupled to the push rod and received within the push rod, and wherein an end of the push rod is positioned between the bearing and the pressure plate.

21. The brake actuator assembly of claim 19, wherein the push rod comprises a first end and a second end, and the push rod is coupled to the pressure plate at the first end of the push rod, wherein the retainer presents a retainer opening that receives a portion of the push rod, wherein the outer surface of the push rod at the first end has an outer diameter that is less than an inner diameter of the retainer opening.

22. The brake actuator assembly of claim 19, further comprising a bearing that is coupled to the push rod, wherein at least a portion of the bearing is received within the push rod, and wherein an end of the push rod is swaged between the bearing and the pressure plate.

23. The brake actuator assembly of claim 19, wherein the opening of the pressure plate extends through the pressure plate from a first end of the pressure plate to a second end of the pressure plate, wherein the push rod extends through the opening in the pressure plate from the first end of the pressure plate to the second end of the pressure plate.

* * * * *